United States Patent

Park et al.

Patent Number: 5,945,748
Date of Patent: Aug. 31, 1999

[54] LINEAR MOTOR STRUCTURE FOR LINEAR COMPRESSOR

[75] Inventors: Jung Sik Park; Hyeong Kook Lee, both of Kyungki-Do; Hyung Jin Kim, Seoul; Eon Pyo Hong, Inchon, all of Rep. of Korea

[73] Assignee: LG Electronics, Inc., Rep. of Korea

[21] Appl. No.: 09/062,447

[22] Filed: Apr. 17, 1998

[30] Foreign Application Priority Data

Apr. 29, 1997 [KR] Rep. of Korea ............... 97/16050
May 31, 1997 [KR] Rep. of Korea ............... 97/22554
May 31, 1997 [KR] Rep. of Korea ............... 97/22555
Aug. 20, 1997 [KR] Rep. of Korea ............... 97/39679

[51] Int. Cl.$^6$ ............... H07K 15/02; H07K 33/02
[52] U.S. Cl. ............... 310/12; 310/42; 310/217; 310/23
[58] Field of Search ............... 310/12, 13, 14, 310/15, 17, 42, 217, 23; 29/596

[56] References Cited

U.S. PATENT DOCUMENTS 5,715,693  2/1998  van der Walt et al. ............... 62/198
5,809,638  9/1998  Neuenschwander ............... 310/217 X Primary Examiner—Thomas M. Dougherty
Assistant Examiner—Judson H. Jone
Attorney, Agent, or Firm—Ostrolenk, Faber, Gerb & Soffen, LLP

[57] ABSTRACT

The present invention relates to a linear motor for a linear compressor that improves efficiency of a motor and simplifies a assembling process for a lamination by which the lamination is fixed by a fixing ring not by a welding process and lead wires are securely disposed. In a linear motor for a linear compressor for introducing and exhausting external gas by compressing, wherein there are an outer lamination and an inner lamination which is wound by a coil connect to lead wires and supported by inner coil springs, the linear motor according to the present invention includes: a lamination wherein protruding portions respectively having a caulking groove are formed at concentric circles of radially arrayed iron pieces, and a conductor connected lead wires which are connected to the coil is fixed thereto; and a non-magnetic fixing ring caulked in the caulking groove for preventing the iron pieces from being loosened.

6 Claims, 9 Drawing Sheets

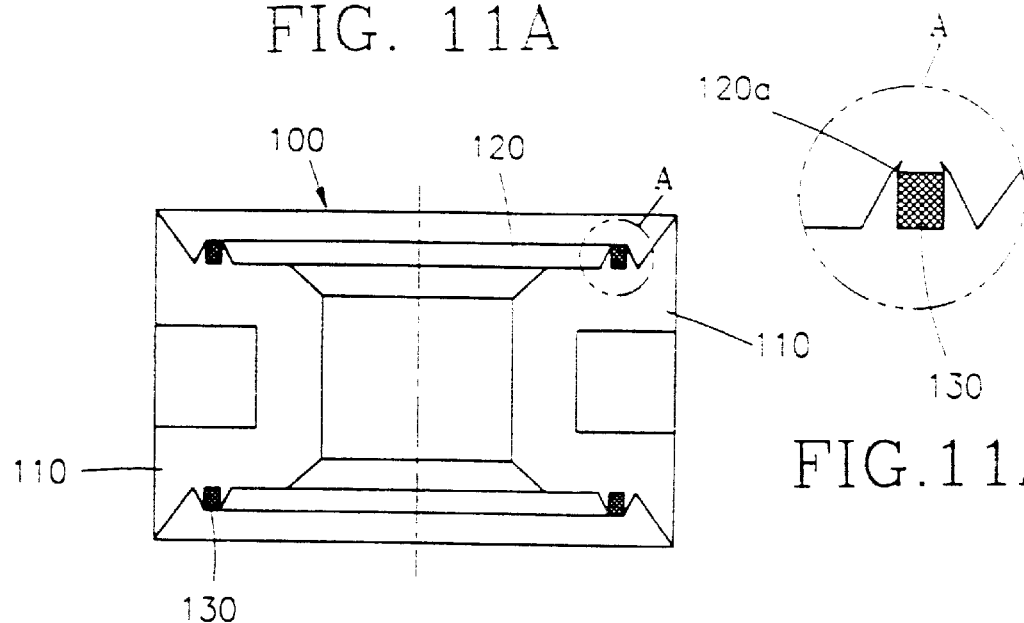
FIG. 11A
FIG. 11A-1
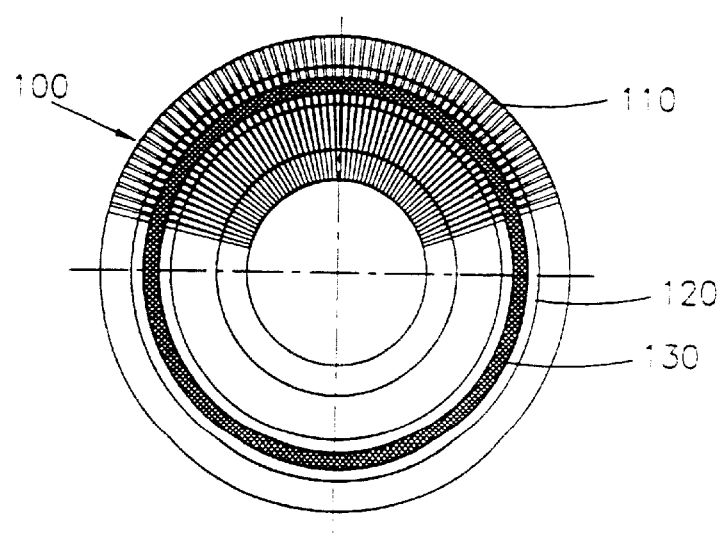
FIG. 11B

LINEAR MOTOR STRUCTURE FOR LINEAR COMPRESSOR

BACKGROUND OF THE INVENTION

1. Field of the Invention

The present invention relates to a linear compressor, and more particularly to a linear motor structure for a linear compressor for improving the efficiency of a motor and easily assembling a lamination provided in the linear motor.

2. Discussion of the background

FIG. 1 illustrates a general linear compressor. As shown therein, a cylindrical inner case 20 is provided in a hermetic case 10, having predetermined inner space.

A cylindrical outer lamination 30 is fixed to an inner wall of the inner case 20, and a disk-type cover plate 40 having a hole in a center portion thereof is connected to an upper end portion of the inner case 20, and a disk-type cover 50 is connected to a lower end portion thereof.

An upper portion of a cylinder 60 penetrates through an opening (not shown) of the center portion of the cover plate 40, and a valve system 70 connected to a center of the upper portion of the cylinder 60 tightly covers the hole through which the cylinder 60 penetrates. In the cylinder 60, there is provided a piston 80 which compresses a refrigerant gas by reciprocation.

A cylindrical inner lamination 90 is provided on a portion of an outer circumferential surface of the cylinder 60, having a predetermined interval from the outer lamination 30.

A coil 95, as shown in FIG. 2, winds a portion of an outer circumferential surface of the inner lamination 90, and one side of the coil 95 is connected to lead wires 95a. A disk-type connecting member 65 connects the piston 80 to a cylindrical magnet paddle 85 to which a plurality of magnets (not shown) are fixed and which is provided between the outer lamination 30 and the inner lamination 90 for transmitting the reciprocation thereof to the piston 80.

Hereinafter, a linear motor M indicates the outer lamination 30, the inner lamination including the coil 95, and the magnet paddle 85 to which the magnets (not shown) are fixed.

Further, a plurality of inner coil springs 66 elastically supporting the reciprocation of the piston 80 are provided between the connecting member 65 and the inner lamination 90, and a plurality of outer coil springs 67 supporting the reciprocation of the piston 80 are disposed between the connecting member 65 and the cover 50.

A numeral 80a which has not been described is a refrigerant gas path provided along a center portion of the piston 80 for introducing external refrigerant gas into the cylinder 60.

An operation of the conventional linear compressor will be described.

First, when power is supplied to the coil 95, the magnet paddle 85 straight reciprocates between the inner lamination 90 and the outer lamination 30, and the piston 80 reciprocates between the piston 80 and the cylinder 60 in accordance with the reciprocation of the magnet paddle 85, for thus refrigerant gas is flowed into the cylinder 60 via the refrigerant gas path 80a provided in the piston 80. The refrigerant gas compressed in the cylinder 60 is exhausted through the valve system 70, and the above-described operation is repeatedly performed.

In the above-described linear compressor, there are two systems wherein the coil 95 is connected to the outer lamination 30 or to the inner lamination 90.

As shown in FIG. 2, the coil 95 molded with an epoxy coils the portion of the outer circumferential surface of the inner lamination 90, and the lead wires 95a are connected to the one side thereof.

FIG. 3 illustrates a part of the outer lamination 30. As shown therein, the outer lamination 30 is provided with a plurality of iron pieces 36 which are radially arrayed. Each iron piece 36 has an opening portion 30a having predetermined width and length in order that the coil 95 may be inserted thereto. Thus, the outer lamination 30 is connected to the coil 95 by which the opening portions 30a of the iron pieces 36 are fixed to the coil 95.

Here, the lead wires 95a are taken out between the assembly members 35 of the outer lamination 30, as shown in FIGS. 4 and 5, and connected to an external power supply.

However, the efficiency of the linear motor M is determined in proportion to the winding number of the coil 95. An entire length of the coil 95 is determined by the winding number of the coil 95. Thus, the more the coil 95 is wound, the greater resistance of the linear motor becomes, for thereby deteriorating the efficiency of the linear motor M.

On the other hand, the system wherein the coil 95 winds the inner lamination 90 will be described.

As shown in FIGS. 6, 7A and 7B, the inner lamination 90 is provided with a plurality of iron pieces 91 which are radially arrayed and of which plane sides respectively correspond to each other. An opening portion 90a is formed in each iron piece 91, and inner end portions of the iron pieces 91 are welded along a weld line 92 to maintain a round shape of the iron pieces 91. Lastly, the coil 95 winds the opening portions 90a of the iron pieces 91. A numeral 93 is a hole for receiving the cylinder 60.

In the above-described structure, as shown in FIGS. 8A and 8B, one side of the lead wires 95a is connected to one side of the coil 95 and the other side thereof is connected to a power supply terminal (not shown), and the lead wires 95a are laid between the inner lamination 90 and the magnet paddle 85.

FIGS. 9A and 9B illustrate an another example that the lead wires 95a are connected to the coil 95. As shown therein, a predetermined number of the iron pieces 91 which constitute the inner lamination 90 are partially severed, for thereby forming a guide groove 99 having predetermined width and length. The lead wires 95a are connected through the guide groove 99 to the coil 95. Here, a bending portion of the lead wires 95a may be protruded out of the guide groove 99.

However, in the system wherein the coil winds the inner lamination, heat generated during the welding process is transmitted to the iron pieces, and thus the thermal transformation unevenly extends the iron pieces. Therefore, a gap between the inner lamination and the outer lamination is extended, for thereby degrading efficiency of the motor and erroneously performing the assembling process.

Also, since the lead wires of the coil winding the inner lamination are laid between the inner lamination and the magnet paddle, the lead wires are damaged when the magnet paddle is in contact with the lead wires in the reciprocation of the magnets.

SUMMARY OF THE INVENTION

Accordingly, the present invention is directed to a linear motor for a linear compressor that obviates the problems due to the related art.

An object of the present invention is to provide a linear motor for a linear compressor that improves efficiency of the motor by simplifying a process for assembling iron pieces of a lamination and uniformly forming inner and outer diameters.

Another object of the present invention is to provide a linear motor for a linear compressor that prevents lead wires of a coil from being damaged.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a linear motor for a linear compressor for introducing and exhausting external gas by compressing, wherein there are an outer lamination and an inner lamination which is wound by a coil connect to lead wires and supported by inner coil springs, the linear motor includes: a lamination wherein protruding portions respectively having a caulking groove are formed at concentric circles of radially arrayed iron pieces; and a fixing ring caulked in the caulking groove for preventing the iron pieces from being loosened.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11A is a vertical cross-sectional view of an inner lamination for a linear compressor according to the present invention wherein the radially arrayed iron pieces are fixed;

FIG. 11B is a plain view of the inner lamination in FIG. 11A;

DETAILED DESCRIPTION OF THE INVENTION

Reference will now be made in detail to the preferred embodiments of the present invention, examples of which are illustrated in the accompanying drawings.

Figure 1:
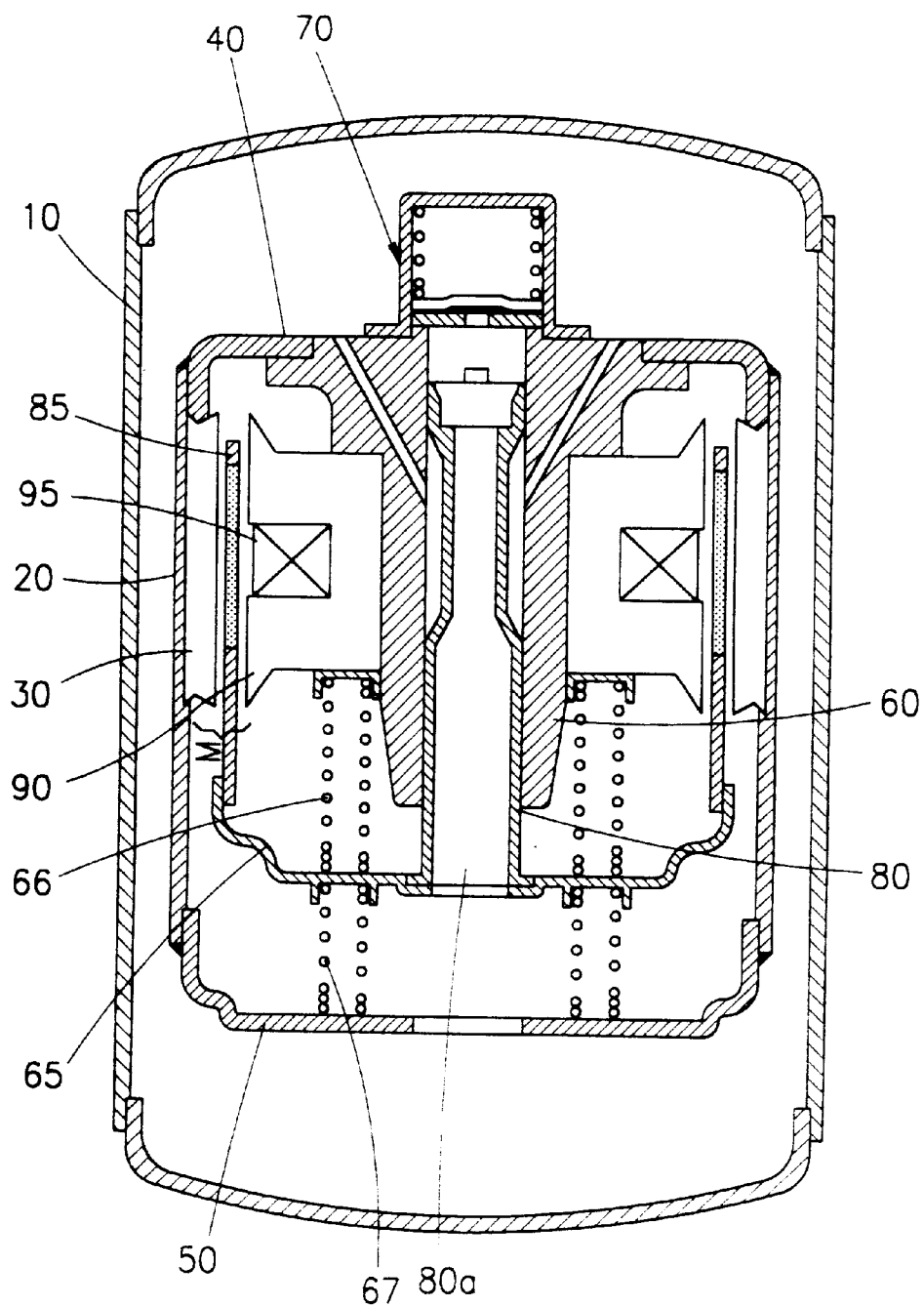
FIG. 1 is a cross-sectional view of an example of a general linear compressor.
Figure 2:
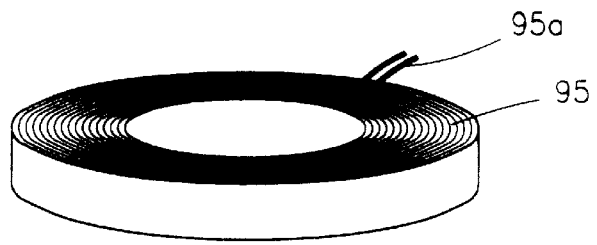
FIG. 2 is a perspective view of a wound coil in the general linear compressor.
Figure 3:
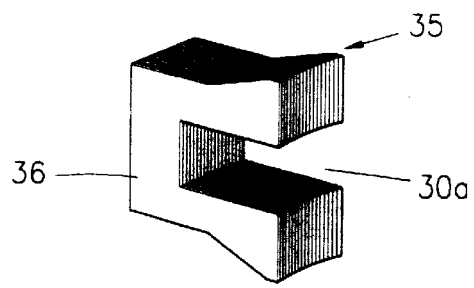
FIG. 3 is a partial-perspective view of an outer lamination of the general linear compressor.
Figure 4:
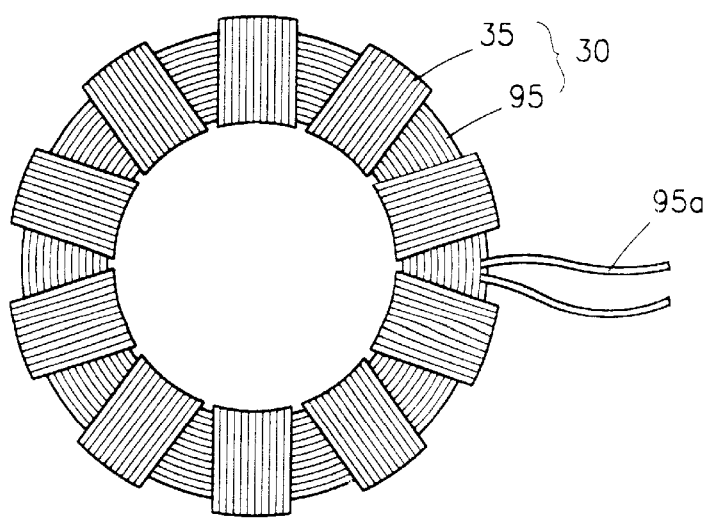
FIG. 4 is a plane diagram of a combined structure of the coil and the outer lamination of the general linear compressor.
Figure 5:
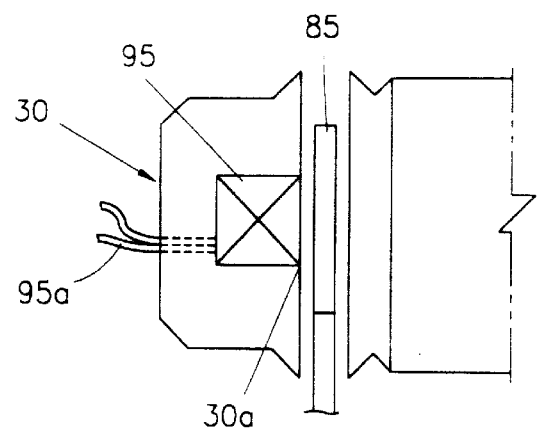
FIG. 5 is a partial cross-sectional view of a conventional linear motor wherein a coil winds an outer lamination.
Figure 6:
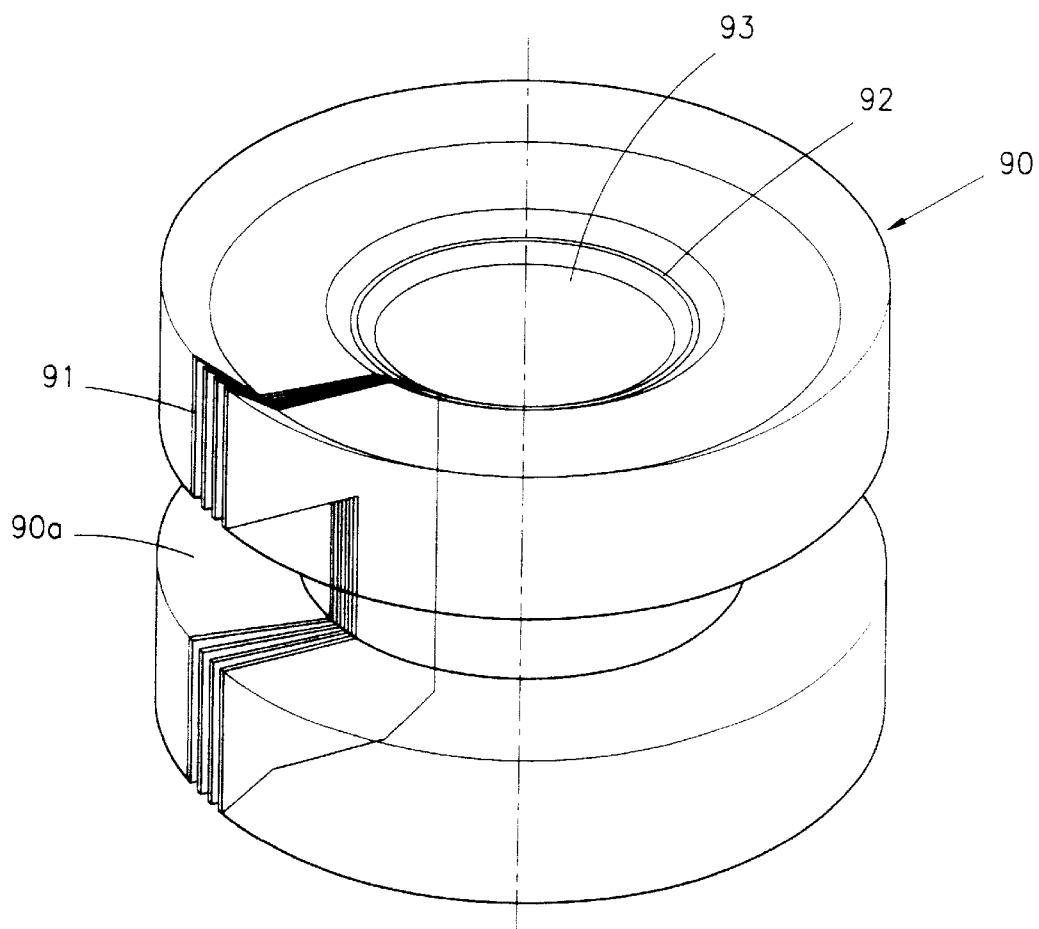
FIG. 6 is a perspective view of an inner lamination of the conventional linear motor.
Figure 7A:
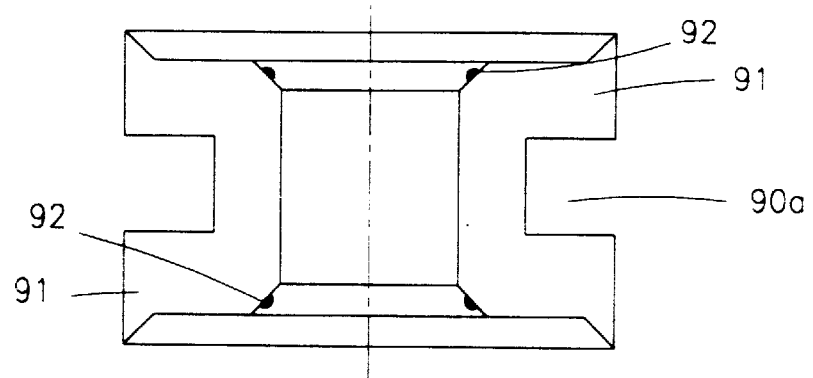
FIG. 7A is a vertical cross-sectional view of the inner lamination in FIG. 6.
Figure 7B:
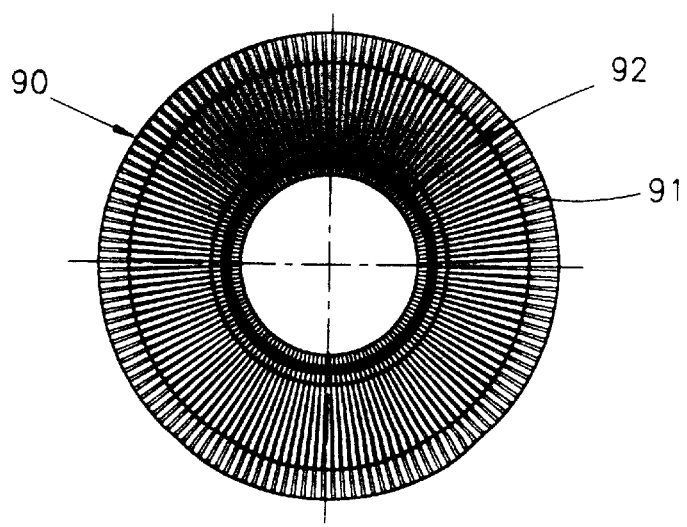
FIG. 7B is a partial-plane view of the inner lamination of the conventional linear motor.
Figure 8A:
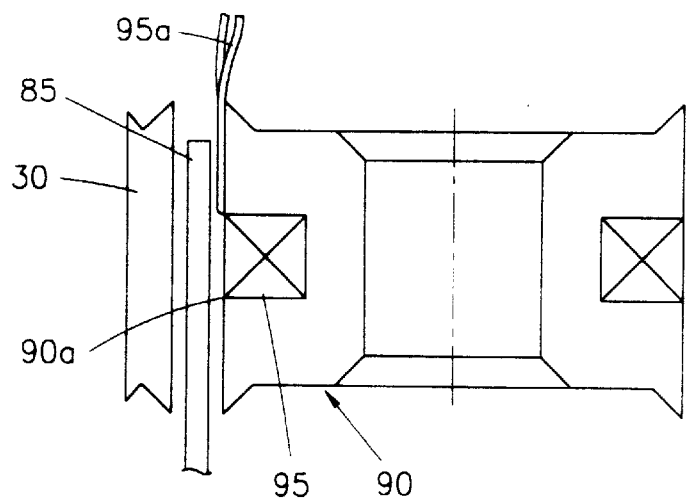
FIG. 8A is a cross-sectional view of an example of lead wire disposition for the conventional linear motor.
Figure 8B:
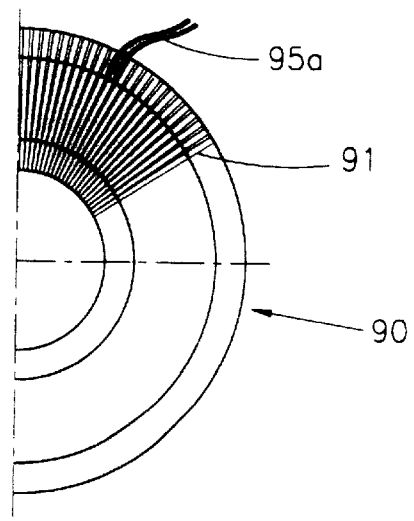
FIG. 8B is a partial-plane view of the lead wire disposition of FIG. 8A.
Figure 9A:
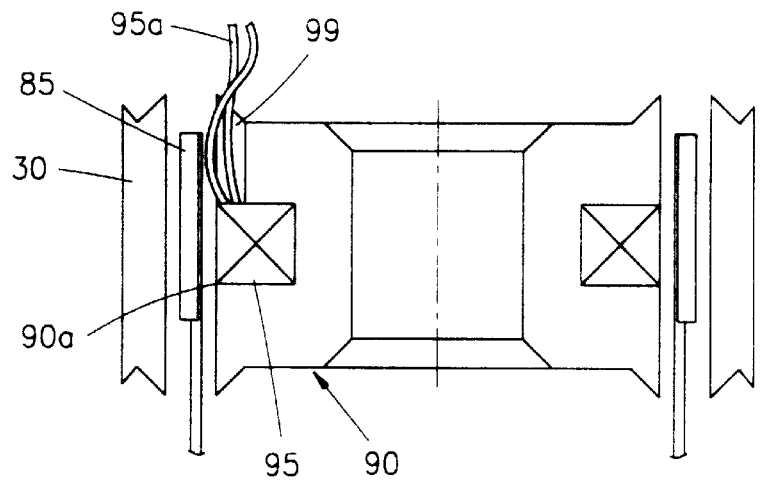
FIG. 9A is a cross-sectional view of another example of lead wire disposition for the conventional linear motor.
Figure 9B:
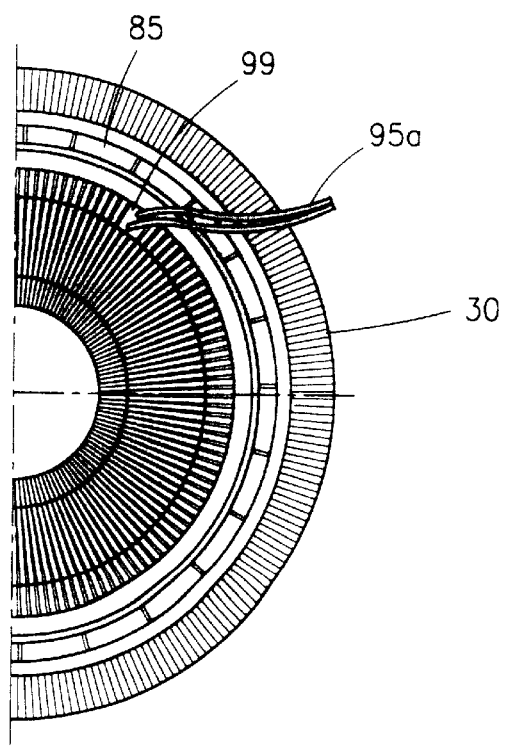
FIG. 9B is a partial-plane view of the lead wire disposition of FIG. 9A.
Figure 10A:
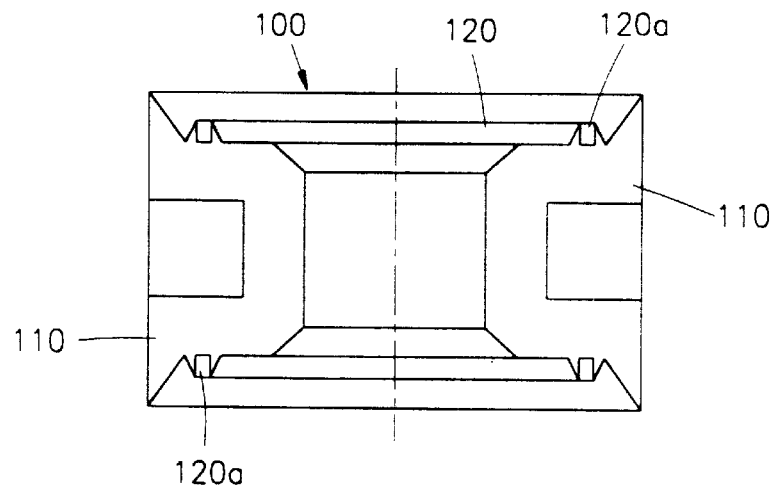
FIG. 10A is a vertical cross-sectional view of an inner lamination for a linear compressor according to the present invention wherein iron pieces are radially arrayed.
Figure 10B:
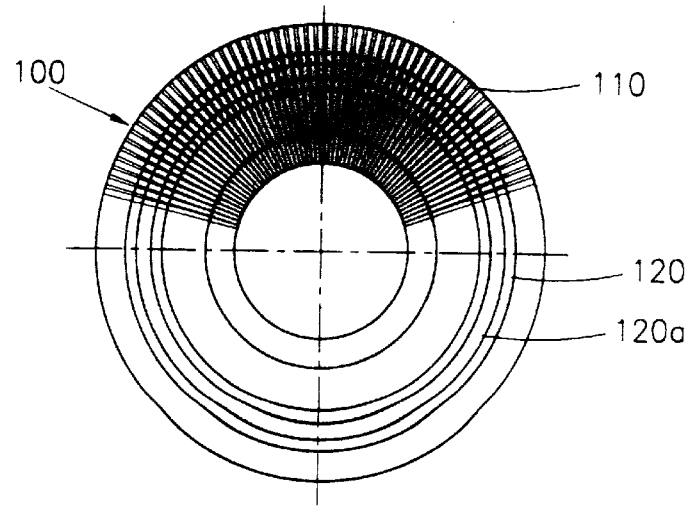
FIG. 10B is a plain view of the inner lamination in FIG. 10A.

FIGS. 10A and 10B illustrate a lamination system of a linear compressor according to the present invention, wherein a lamination 100 is provided with a plurality of iron pieces which are radially arrayed, and FIGS. 11A and 11B illustrate the lamination system of the invention wherein the thusly provided lamination 100 is fixed by a fixing ring 130.

Specifically, protruding portions 120 are formed at concentric circles of radially arrayed iron pieces and respectively have a caulking groove 120a.

A fixing ring 130, which is formed of a non-magnetic material or a material having high electric resistance, is caulked by the caulking groove 120a of each protruding portion 120.

Figure 12:
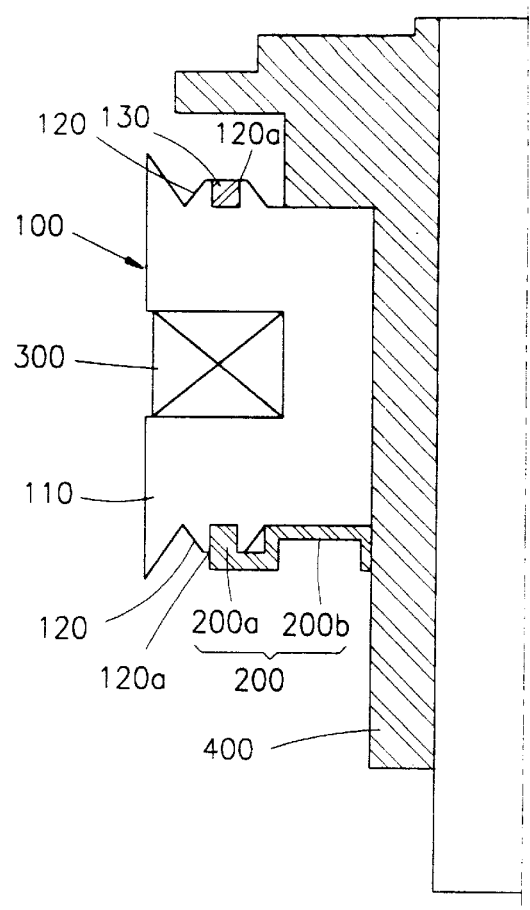
FIG. 12 is a cross-sectional view of a linear motor illustrating another type of a fixing ring according to the present invention.

In addition, as shown in FIG. 12, a fixing ring at one side of the lamination 100, which is supported by inner coil springs (not shown), may be formed of a fixing member 200 of which a fixing ring 200a fixes the lamination 100 and a ringshaped supporter 200b supports the inner coil springs. The fixing ring 200a and the ringshaped supporter 200b are formed as a single body. A numeral 400 is a cylinder. Thus, the fixing rings 130 may fix both sides of each iron piece 110, or the fixing ring 130 and the fixing member 200 may respectively fix each side of the iron piece 110.

Figure 13:
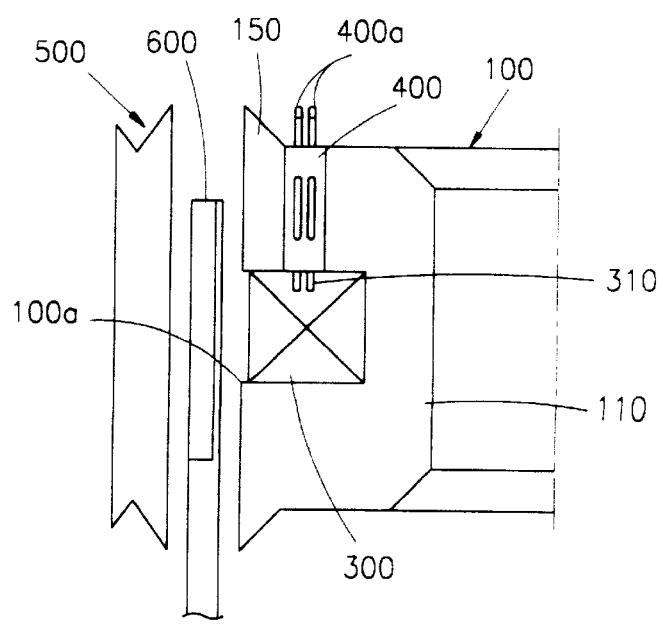
FIG. 13 is a cross-sectional view of a linear motor illustrating lead wire disposition according to the present invention.

In FIG. 13, a fixing groove 150 having predetermined width and depth is formed at one side of the lamination 100, and a conductor 400 is fixed to the fixing groove 150. The fixing groove 150 is formed by severing a predetermined number of the iron pieces 110 in order that an opening portion 100a wound by a coil 300 is connected to one side of the lamination 100, and the conductor 400 has a pair of protruding terminals 400a which are connected to external power supply. Further, the conductor 400 is connected to lead wires 310, and molded by an epoxy which insulates the coil 300. Numerals 500 and 600 are outer lamination and a magnet paddle which reciprocates between the two laminations 500, 100, respectively.

The description of operation of a linear compressor having the linear motor according the present invention will be omitted, since it is identical to the conventional art.

As described above, the linear motor for the liner compressor according to the present invention has several advantages in that thermal transformation is not occurred since additional heat treatment is not required in order to fix the iron pieces and mass-productivity can be improved by which a measurement error is not made in the process of a mechanical assembly. In addition, since a width of each iron piece is uniform, the lamination has the inner and outer diameters of the lamination which are evenly formed, for thus improving the efficiency of the motor, and stability of the motor is secured because the invention prevents the lead wires from being damaged during the operation of the motor due to the simple disposition system for the lead wires.

It will be apparent to those skilled in the art that various modifications and variations can be made in the linear motor for the linear compressor of the present invention without departing from the spirit or scope of the invention. Thus, it is intended that the present invention cover the modifications and variations of this invention provided they come within the scope of the appended claims and their equivalents.

What is claimed is:

1. A linear motor for a linear compressor for introducing and exhausting external gas by compressing, wherein there are an outer lamination and an inner lamination which is wound by a coil connected to lead wires and supported by inner coil springs, the improvement comprising:

a lamination wherein protruding portions respectively having a caulking groove are formed at concentric circles of radially arrayed iron pieces; and a fixing ring caulked in the caulking groove for preventing the iron pieces from being loosened.

2. The linear motor according to claim 1, wherein the fixing ring is a non-magnetic body.

3. The linear motor according to claim 1, wherein the fixing ring is a material having high electric resistance.

4. The linear motor according to claim 1, wherein said fixing ring at one side of the lamination which is supported by inner coil springs, is formed of a fixing member of which a fixing ring fixes the lamination by being caulked in the caulking groove and a ringshaped supporter supports the inner coil springs and the fixing ring and the supporter are formed as a single body.

5. The linear motor according to claim 1, wherein a fixing groove having predetermined width and depth is formed at one side of the lamination wound by the coil and a conductor connected to lead wires which are connected to the coil is fixed to the fixing groove.

6. The linear motor according to claim 5, wherein the conductor is molded by an epoxy which insulates said coil.

* * * * *